US012327088B1

(12) United States Patent
Li et al.

(10) Patent No.: US 12,327,088 B1
(45) Date of Patent: Jun. 10, 2025

(54) METHOD AND SYSTEM FOR GENERATING ABSTRACT OF SMART CONTRACT BASED ON LARGE LANGUAGE MODEL AND SEMANTIC ENHANCEMENT

(71) Applicant: Hainan University, Hainan (CN)

(72) Inventors: Xiaoqi Li, Haikou (CN); Yingjie Mao, Haikou (CN); Wenkai Li, Haikou (CN); Xin Wang, Haikou (CN); Lei Xie, Haikou (CN)

(73) Assignee: HAINAN UNIVERSITY, Haikou (CN)

( * ) Notice: Subject to any disclaimer, the term of this patent is extended or adjusted under 35 U.S.C. 154(b) by 0 days.

(21) Appl. No.: 19/031,223

(22) Filed: Jan. 17, 2025

(30) Foreign Application Priority Data

Jul. 22, 2024 (CN) .......................... 202410980531.5

(51) Int. Cl.
*G06F 17/00* (2019.01)
*G06F 40/211* (2020.01)
*G06F 40/30* (2020.01)

(52) U.S. Cl.
CPC ............ *G06F 40/30* (2020.01); *G06F 40/211* (2020.01)

(58) Field of Classification Search
None
See application file for complete search history.

(56) References Cited

U.S. PATENT DOCUMENTS

| | | | | |
|---|---|---|---|---|
| 10,809,984 | B2 * | 10/2020 | Mizrahi | G06F 40/242 |
| 11,068,244 | B2 * | 7/2021 | Rich | G06F 8/51 |
| 11,301,619 | B2 * | 4/2022 | Choudhari | G06F 40/151 |
| 11,893,385 | B2 * | 2/2024 | Balasubramanian | G06F 8/75 |
| 2023/0106226 | A1 * | 4/2023 | Bahrami | G06N 3/04 717/110 |
| 2024/0111658 | A1 * | 4/2024 | Bo | G06F 11/3624 |

* cited by examiner

*Primary Examiner* — Satwant K Singh
(74) *Attorney, Agent, or Firm* — Muncy, Geissler, Olds & Lowe, P.C.

(57) ABSTRACT

A method and system for generating an abstract of a smart contract based on a large language model and semantic enhancement. The method includes: parsing a source code of a smart contract to generate an abstract syntax tree; extracting code semantic information; converting a contract function node of the abstract syntax tree into a function callback chart; and generating a high-quality abstract of code of the smart contract by utilizing the code semantic information extracted by the large language model and callback information in the function callback chart. By learning and understanding the semantic information and callback information of the smart contract function, the large language model can accurately understand and reason deep semantic information of the code to generate the high-quality abstract of the code of the smart contract. The a multi-model capability of the large language model to extract, understand, and reason the callback information of the function callback chart improves comprehension capability of the large language model on a code callback structure.

8 Claims, 4 Drawing Sheets

METHOD AND SYSTEM FOR GENERATING ABSTRACT OF SMART CONTRACT BASED ON LARGE LANGUAGE MODEL AND SEMANTIC ENHANCEMENT

FIELD OF TECHNOLOGY

The present invention relates to the technical field of blockchains, and particularly relates to a method and system for generating an abstract of a smart contract based on a large language model and semantic enhancement, a computer device, and a readable storage medium.

BACKGROUND

A smart contract is a self-executable program running in a blockchain system. The smart contract will automatically execute special operations only when a special condition is met, for example, transfer or log query. Regardless of advantages of automatic execution and openness and transparency, the smart contract also faces some critical challenges. Due to the immutability of the blockchain system, smart contracts deployed in blockchains all are unchangeable, so that it is especially difficult to maintain and test the smart contracts. In the prior art, methods for automatically generating an abstract of a code of a smart contract usually include methods based on a deep learning model, methods of a natural language processing model based on pre-training, and a large language model, for example, an MMTrans tool, a CodeT5+ model, and a GPT-4o model. Although large language models similar to GPT-4o and Gemini-1.5-pro have made great improvements in the automatic generation of the abstract of the code of the smart contract, they also have boundedness. The boundedness is especially shown as follows: limited to "prompt" of insufficient information: code semantic information provided in zero sample "prompt" is not enough to support the large language model to generate the abstract of the code according to semantic reasoning, which is because that the "prompt" does not contain key hidden information in the provided code segment; limited to control stream information contained in promotion: the large language model uses few samples or zero sample to learn the "prompt" to generate the abstract of the code. However, a pure text "prompt" often cannot express function callback information in the code segment. This limit challenges the ability of the large language model to understand a function call tree, which results in low quality of the generated abstract of the code.

Therefore, a conventional method for generating an abstract of a smart contract has the problem of poor quality.

SUMMARY

On this basis, in order to solve the above technical problems, a method and system for generating an abstract of a smart contract based on a large language model and semantic enhancement is provided, which improves the quality of the abstract of the code of the smart contract generated by a large language model, and can be applied to development and maintenance stages of the smart contract to help developers fast understand the code, so as to realize a safer smart contract.

A method for generating an abstract of a smart contract based on a large language model and semantic enhancement, including:

acquiring a source code of a smart contract, and parsing the source code of the smart contract to generate an abstract syntax tree;

extracting code semantic information in the source code of the smart contract from the abstract syntax tree;

traversing the abstract syntax tree, converting the source code of the smart contract into a function callback chart, and storing the function callback chart and the code semantic information in a code sample database;

determining a target code segment, and searching for, in the code sample database, target code semantic information most similar to the target code segment and a target function callback chart; and inputting a source code of the target code segment, the target code semantic information, and the target function callback chart into the large language model, and parsing data outputted by the large language model to obtain an abstract corresponding to the target code segment and outputting the abstract.

In one of the embodiments, the parsing the source code of the smart contract to generate an abstract syntax tree includes:

parsing the source code of the smart contract by using a solidity_parser tool, and taking the smart contract or a function in the source code of the smart contract as a root node, a sentence or expression as an internal node, and basic elements such as a variable and a constant as leaf nodes.

In one of the embodiments, the code semantic information includes a contract member variable, a contract type, a contract function, a function name, a function declaration, an introverted function, and function callback.

In one of the embodiments, the traversing the abstract syntax tree, and converting the source code of the smart contract into a function callback chart include:

traversing each contract node in the abstract syntax tree, traversing each function node in each contract node, and traversing a function callback node in each function node;

traversing each function callback node to obtain a function callback tree;

traversing each function callback node in the function callback tree to obtain callback information corresponding to each function callback node; and obtaining a vector-free function callback chart based on the callback information.

In one of the embodiments, the method further includes:

describing the callback information corresponding to the function callback node by using graphviz;

storing the function callback node after the callback information is described in an unordered non-repetitive element sequence; and traversing each function callback node in the function callback tree, and searching for nodes in the non-repetitive element sequence till traversing the function callback tree to obtain the vector-free function callback chart.

In one of the embodiments, the determining, in the code sample database, a target code segment, and searching for, in the code sample database, target code semantic information most similar to the target code segment and a target function callback chart include:

vectorizing the target code segment to obtain an input matching vector;

reading all function codes in the code sample database and converting each function code into a function code vector list;

matching the input matching vector with the function code vector list to output a target number corresponding to the function code vector most similar to the input matching vector; and reading the target code semantic information and the target function callback chart from the code sample database according to the target number.

In one of the embodiments, a training process of the large language model includes:

determining sample code semantic information and a sample function callback chart and inputting the sample code semantic information and the sample function callback chart into the large language model; and adjusting parameters in the large language model by taking the target code semantic information and the target function callback chart as learning objects.

A system for generating an abstract of a smart contract based on a large language model and semantic enhancement, including:

an abstract syntax generation module, configured to acquire a source code of a smart contract, and parse the source code of the smart contract to generate an abstract syntax tree;

an information extraction module, configured to extract code semantic information in the source code of the smart contract from the abstract syntax tree;

a data storage module, configured to traverse the abstract syntax tree, convert the source code of the smart contract into a function callback chart, and store the function callback chart and the code semantic information in a code sample database;

a searching module, configured to determine a target code segment, and search for, in the code sample database, target code semantic information most similar to the target code segment and a target function callback chart; and an abstract generation module, configured to input a source code of the target code segment, the target code semantic information, and the target function callback chart into the large language model, and parse data outputted by the large language model to obtain an abstract corresponding to the target code segment and outputting the abstract.

A computer device, including a memory and a processor, the memory storing a computer program, where the processor performs the steps when executing the computer program:

acquiring a source code of a smart contract, and parsing the source code of the smart contract to generate an abstract syntax tree;

extracting code semantic information in the source code of the smart contract from the abstract syntax tree;

traversing the abstract syntax tree, converting the source code of the smart contract into a function callback chart, and storing the function callback chart and the code semantic information in a code sample database;

determining a target code segment, and searching for, in the code sample database, target code semantic information most similar to the target code segment and a target function callback chart; and inputting a source code of the target code segment, the target code semantic information, and the target function callback chart into the large language model, and parsing data outputted by the large language model to obtain an abstract corresponding to the target code segment and outputting the abstract.

A computer readable storage medium, having a computer readable instruction stored therein, where the computer program, when executed by a processor, implements the following steps:

acquiring a source code of a smart contract, and parsing the source code of the smart contract to generate an abstract syntax tree;

extracting code semantic information in the source code of the smart contract from the abstract syntax tree;

traversing the abstract syntax tree, converting the source code of the smart contract into a function callback chart, and storing the function callback chart and the code semantic information in a code sample database;

determining a target code segment, and searching for, in the code sample database, target code semantic information most similar to the target code segment and a target function callback chart; and inputting a source code of the target code segment, the target code semantic information, and the target function callback chart into the large language model, and parsing data outputted by the large language model to obtain an abstract corresponding to the target code segment and outputting the abstract.

According to the method and system for generating an abstract of a smart contract based on a large language model and semantic enhancement, the computer device, and the readable storage medium, by learning and understanding the semantic information and callback information of the smart contract function, the large language model can accurately understand and reason deep semantic information of the code to generate the high-quality abstract of the code of the smart contract, which not only effectively overcomes the boundedness of semantic understanding in the prior art, but also uses a multi-model capability of the large language model to extract, understand, and reason the callback information of the function callback chart, thereby greatly improving the comprehension capability of the large language model on a code callback structure.

DESCRIPTION OF THE EMBODIMENTS

In order to make the objectives, technical solutions, and advantages of the present application more clearly, the present application is further described in detail below in conjunction with drawings and embodiments. It is be understood that the specific examples described herein are merely used for explaining the present application, instead of limiting the present application.

Figure 1:
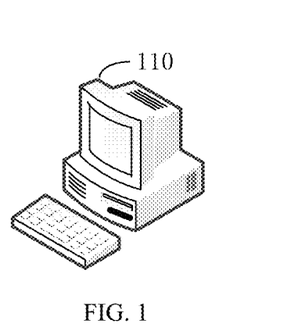
FIG. 1 is an application environment diagram of a method for generating an abstract of a smart contract based on a large language model and semantic enhancement in an embodiment.

The method for generating an abstract of a smart contract based on a large language model and semantic enhancement provided in the embodiment of the present application can be applied to an application environment shown in FIG. 1. As shown in FIG. 1, the application environment includes a computer device 110. The computer device 110 can acquire a source code of a smart contract, and parse the source code of the smart contract to generate an abstract syntax tree; the computer device 110 can extract code semantic information in the source code of the smart contract from the abstract syntax tree; the computer device 110 can traverse the abstract syntax tree, convert the source code of the smart contract into a function callback chart, and store the function callback chart and the code semantic information in a code sample database; the computer device 110 can determine a target code segment, and search for, in the code sample database, target code semantic information most similar to the target code segment and a target function callback chart; and the computer device 110 can input a source code of the target code segment, the target code semantic information, and the target function callback chart into the large language model, and parse data outputted by the large language model to obtain an abstract corresponding to the target code segment and output the abstract. The computer device 110 can be, but is not limited to, various devices such as a personal computer, a notebook computer, a smart phone, a robot, and a tablet personal computer.

Figure 2:
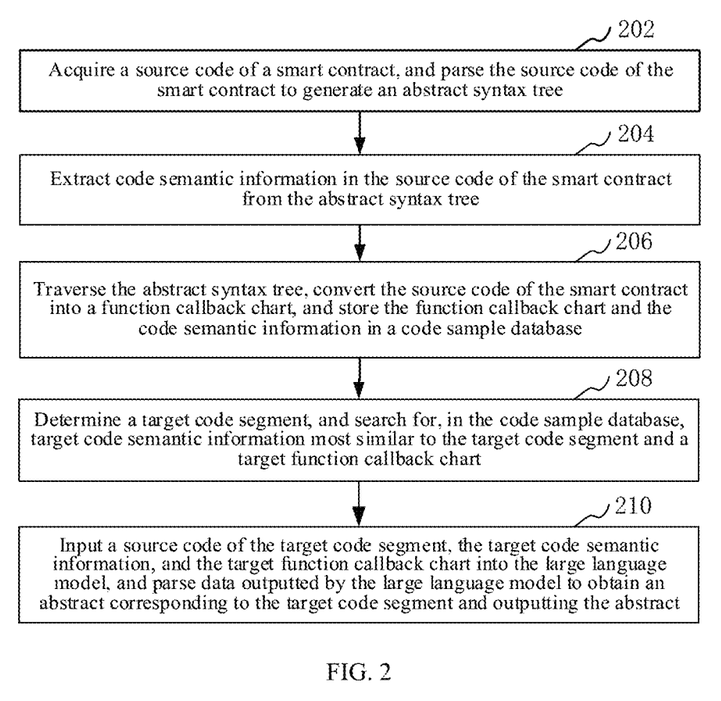
FIG. 2 is a flowchart of a method for generating an abstract of a smart contract based on a large language model and semantic enhancement in an embodiment.

In one embodiment, as shown in FIG. 2, provided is a method for generating an abstract of a smart contract based on a large language model and semantic enhancement, including the following steps:

Step 202, a source code of a smart contract is acquired, and the source code of the smart contract is parsed to generate an abstract syntax tree.

Specifically, in one embodiment, the provided method for generating an abstract of a smart contract based on a large language model and semantic enhancement can further include a process of generating the abstract syntax tree, which specifically includes: parsing the source code of the smart contract by using a solidity_parser tool, and taking the smart contract or a function in the source code of the smart contract as a root node, a sentence or expression as an internal node, and basic elements such as a variable and a constant as leaf nodes.

The computer device can parse the source code of the Solidity smart contract into an intact abstract syntax tree through a solidity_parser tool in a third-party library in Python. The generated abstract syntax tree is a tree structure representation of the source code. The root node of the tree represents the entire smart contract or function. Each internal node represents a sentence or an expression. The leaf nodes represent variables, constants, or other basic elements. By generating the abstract syntax tree, the semantic relationship between program elements can be effectively encapsulated, so that the program logic can be better understood and operated.

Step 204, code semantic information in the source code of the smart contract is extracted from the abstract syntax tree.

In one embodiment, the code semantic information can include a contract member variable, a contract type, a contract function, a function name, a function declaration, an introverted function, and function callback.

Figure 3:
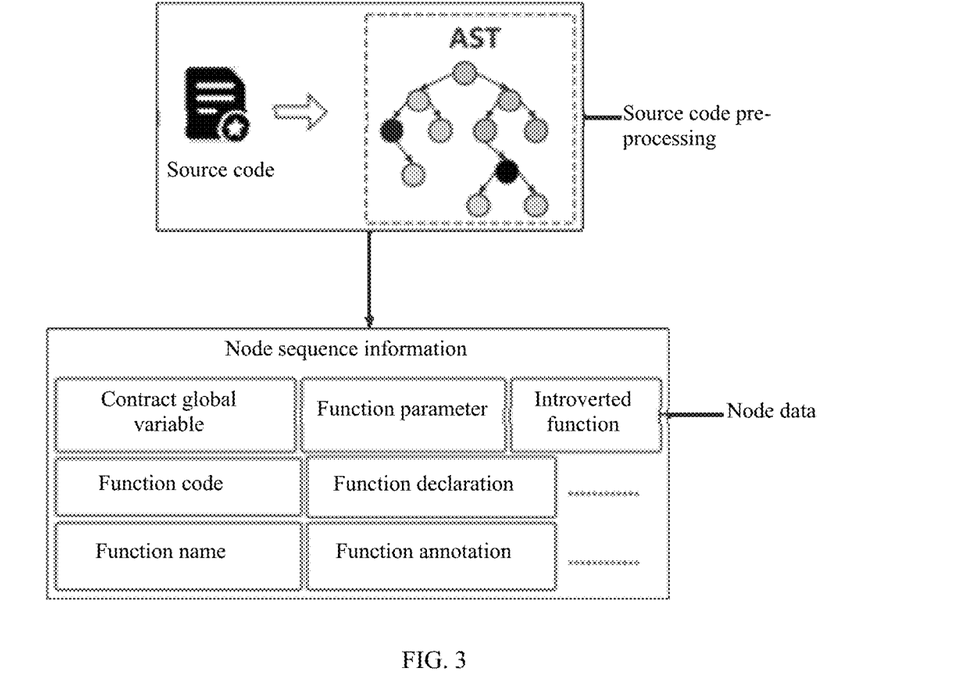
FIG. 3 is a schematic diagram of semantic information extraction in an embodiment.

As shown in FIG. 3, the computer device can extract the code semantic information by traversing the abstract syntax tree, for example, the contract member variable, the function declaration, the introverted function, the function callback, and the like. Specifically, in the embodiment, the computer device can extract seven kinds of information relevant to the semantics of the code from the abstract syntax tree, including the contract member variable, the contract type, the contract function, the function name, the function declaration, the introverted function, and the function callback. The contract member variable includes all variable and constant declaration nodes of the contract; the contract type includes all contract declaration types; the contract function includes all function nodes in the contract; the function name includes a function name node; the function declaration includes all function declaration nodes; the introverted function includes a code block of an internal call function in the function; and the function callback includes all callback nodes of the function.

As shown in FIG. 3, the extracting the code semantic information is crucial to deeply understanding the semantics of the code through the large language model. This semantic information helps the large language model understand the core semantics of the code to generate the abstract of the code with higher quality. Specifically, the accuracy of the semantic information is crucial to generating the abstract of the code, and in the task of automatically generating the abstract of the code, different types of nodes include different semantic information.

The code semantic information respectively has the following effects: the contract member variable: a globally used variable defined in the smart contract, which is globally used in the function; the contract type, which expresses the construction type of the contract and a contract construction function, the contract construction function including construction information of contract start; the contract function, which defines the function used in the contract, including an external call function and an internal function; the function name, which declares the use and a naming rule of the function; the function declaration: function and method declaration nodes can represent the function and operation of the contract smart; the introverted function, which represents another function called in one function, enriching the call information of the function; and the function callback, which represents functions included in all callback nodes in one function node, representing a primary callback structure of the function.

In the embodiment, in addition to extracting the code semantic information, node attributes are also reserved, which are defined as a tuple (Nid, Non, Nct, Ncv, Ncc, Nfn, Nfv, Nfc, and Nfi), where Nid represents the id of the smart contract, Non represents the name of the smart contract, Nct represents the type of the smart contract, Ncv represents the member variable of the smart contract, Ncc represents the construction function of the smart contract, Nfn represents the function name, Nfv represents the function declaration, Nfc represents the function code, and Nfi represents the code of the introverted function. These attributes provide direct representations of the data, facilitating an efficient operation and ensuring invariance. Step 206, the abstract syntax tree is traversed, the source code of the smart contract is converted into a function callback chart, and the function callback chart and the code semantic information are stored in a code sample database.

In one embodiment, the provided method for generating an abstract of a smart contract based on a large language model and semantic enhancement can further include a process of generating the function callback chart, which specifically includes: traversing each contract node in the abstract syntax tree, traversing a function node in each contract node, and traversing a function callback node in each function node; traversing each function callback node to obtain a function callback tree; traversing each function callback node in the function callback tree to obtain callback information corresponding to each function callback node; and obtaining a vector-free function callback chart based on callback information.

Specifically, in one embodiment, the computer device can describe the callback information corresponding to the function callback node by using graphviz; storing the function callback node after the callback information is described in an unordered non-repetitive element sequence; and traversing each function callback node in the function callback tree, and searching for nodes in the non-repetitive element sequence till traversing the function callback tree to obtain the vector-free function callback chart.

Figure 4:
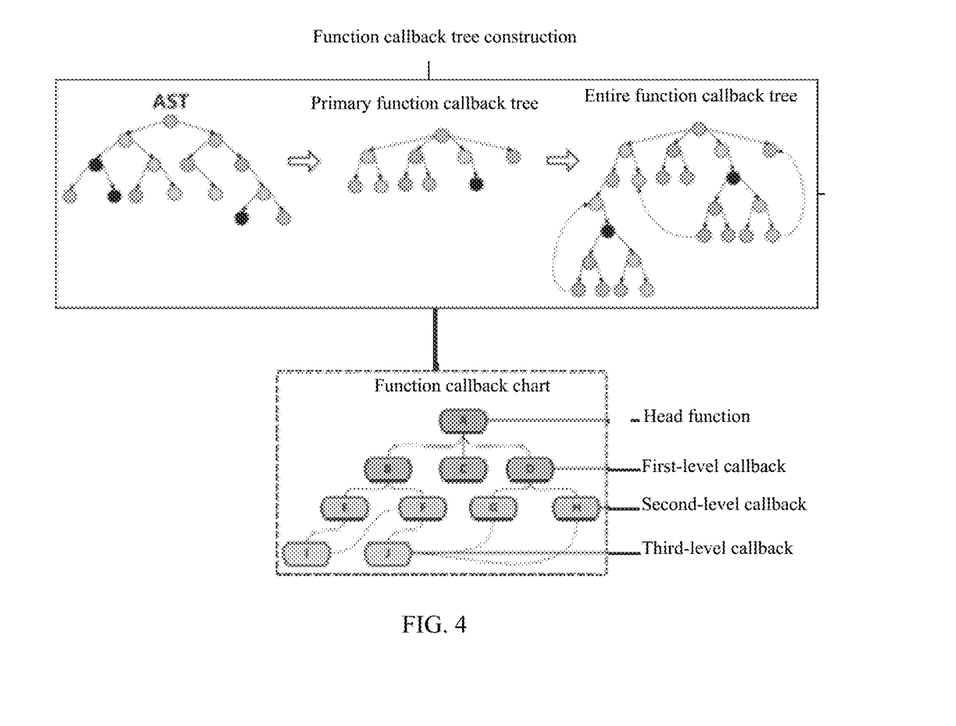
FIG. 4 is a schematic diagram of the generation of a function callback chart in an embodiment.

As shown in FIG. 4, the process of generating the function callback chart can specifically include: constructing a primary function callback tree, constructing the function callback tree, and generating the function callback chart.

The constructing the primary function callback tree includes: in constructing the primary function callback tree, started from the root node of the abstract syntax tree, performing depth-first traversal on each contract node by using depth, then traversing the function node in the contract node, and then traversing the function callback node of each function node, where this process is performed recursively till the entire abstract syntax tree is traversed; and finally, storing the information of the function callback node in a dictionary collection according to a sequence of contract name-function name-callback function name-callback function node to construct the primary function callback tree. The constructing the primary function callback tree can provide the function callback information of each function in the abstract syntax tree, so as to clearly express a callback attribution of each function.

The constructing the intact function callback tree includes: acquiring the name of the next callback function from the function callback node by using each function callback node of the primary function callback tree constructed by depth-first traversal; if the function name is at the position of the function node corresponding to the primary function callback tree, taking out the function callback node at the position and splicing it behind the node of the function name; and if there is no name of the next callback function in the function callback node, skipping this node to access the next node till the entire function callback node is traversed, so as to finally obtain the entire function callback tree.

The generating the function callback chart includes: drawing a vector-free function callback chart by using a graphviz method base, traversing each function callback node of the entire function callback tree, describing the callback information of each function callback node by using graphviz, storing the accessed nodes in an unordered non-repetitive element sequence, and if the currently accessed node has emerged in the sequence, skipping this node to access the next node till the entire intact function callback tree is traversed, to finally obtain the vector-free function callback chart.

Step 208, a target code segment is determined, and in the code sample database, target code semantic information most similar to the target code segment and a target function callback chart are searched.

In one embodiment, the provided method for generating an abstract of a smart contract based on a large language model and semantic enhancement can further include a process of searching for target code semantic information most similar to the target code segment and a target function callback chart, which specifically includes: vectorizing the target code segment to obtain an input matching vector; reading all function codes in the code sample database and converting each function code into a function code vector list; matching the input matching vector with the function code vector list to output a target number corresponding to the function code vector most similar to the input matching vector; and reading the target code semantic information and the target function callback chart from the code sample database according to the target number.

Specifically, during semantic matching, the computer device can vectorize the target text code as an input matching vector of sentence_transformers; read the codes of all functions in the code sample library and convert the codes into the function code vector list as a semantic matching reference sample example of sentence_transformers; and finally, output the numbers of n code segments most matching the target code in terms of semantics in the library after semantic matching of a sentence_transformers model in terms of semantics and syntax, and finally, read corresponding code semantic information and function callback chart according to the numbers.

That is to say, the computer device can match n code learning samples by using a finely adjusted sentence_transformers model, where the sentence_transformers model is one of a Sbert model, a lightweight model, and the similarity of two sentences can be calculated according to semantics. First, sentence_transformers encode a sentence with semantic similarity to obtain a vector representation of the sentence, and then the cosine similarity between two sentence vectors is calculated by using a cos_sin function of the sentence_transformers. The value is closer to 1, which means that the two sentences are more similar in semantics, and the value is closer to 0, which means that the two sentences are not similar.

Step 210, a source code of the target code segment, the target code semantic information, and the target function callback chart are inputted into the large language model, and data outputted by the large language model is parsed to obtain an abstract corresponding to the target code segment and the abstract is outputted.

In one embodiment, a training process of the large language model can include: determining sample code semantic information and a sample function callback chart and inputting the sample code semantic information and the sample function callback chart into the large language model; and adjusting parameters in the large language model by taking the target code semantic information and the target function callback chart as learning objects.

Taking acquired n samples most similar to the target code in semantics as few sample learning objects of the large language model, by learning the function semantic information, the function callback chart, and the abstract corresponding to the sample function in the n samples, the abstract in the similar learning samples is finally generated by understanding and reasoning the semantic information and the function callback chart of the target code.

Figure 5:
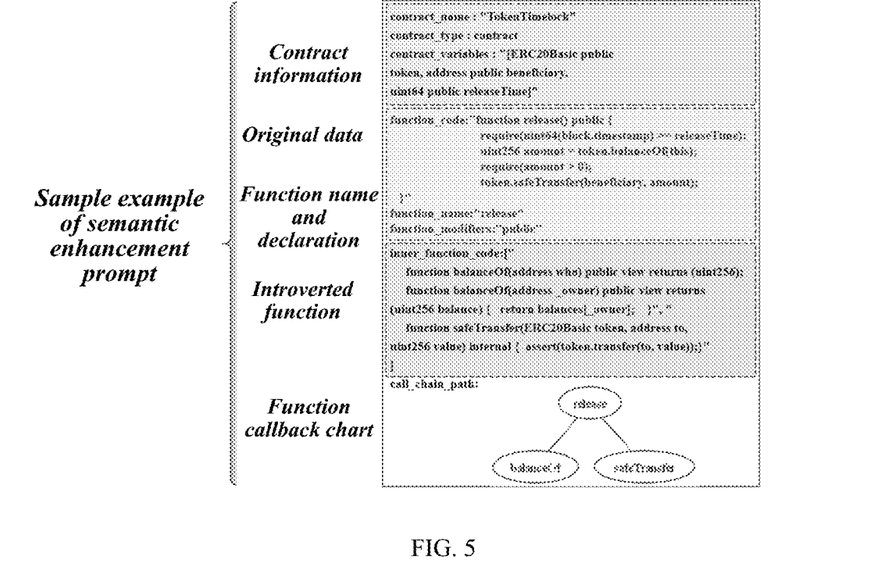
FIG. 5 is a schematic diagram of a semantic enhancement "prompt" in an embodiment.

In the embodiment, a sample learning and voice enhancing method is used to enhance understanding of the semantics of the code by the large language model. The large language model can enhance the reasoning capability and output a similar result by learning the samples in the "prompt". As shown in FIG. 5, the sample examples include the semantic information and the function callback chart of the code.

In the embodiment, an appointed Jason format can be used to parse a returned result of the large language model, and finally, the abstract of the target code segment is outputted to a user interface.

It shall be understood that although various steps in the flowchart of drawings are shown sequentially as indicated by the arrows, these steps are not necessarily performed sequentially as indicated by the arrows. Unless explicitly stated otherwise herein, the steps are not performed in a strict order limitation, and the steps may be performed in other orders. Moreover, at least part of the steps in the flow chart may include a plurality of sub-steps or phases that are not necessarily performed at the same time, but may be performed at different times. The sub-steps or phases are not necessarily performed sequentially, but may be performed in turn or alternately with at least part of the other steps or the sub-steps or phases of the other steps.

In one embodiment, to verify the effect of the method for generating an abstract of a smart contract based on a large language model and semantic enhancement provided in the present application, the following experiments are conducted:

Wide experiments are conducted on a data set including 14790 method and comment pairs. These methods are from a smart contract dataset on github, which includes more than 40000 real Ethereum smart contracts. Mean token lengths and annotation lengths of a training set, a test set, and a verification set in the dataset are shown in the following table:

| Type | Training set | Verification set | Test set |
|---|---|---|---|
| Quantity | 11032 | 2758 | 1000 |
| Mean token length of code | 42.44 | 42.08 | 41.95 |
| Mean token length of abstract | 26.34 | 26.16 | 26.66 |

To verify the performance of a frame, the method for generating an abstract of a smart contract based on a large language model and semantic enhancement provided in the present application is compared with several current most advanced methods for automatically generating an abstract of a code. First, the method in the present application is compared with a CodeBert mode: CodeBert is a bi-modal pre-training model for natural language (NL) and programming language (PL), which performs pre-training by using mask language modeling (MLM) and replacement tag detection (RTD) tasks; then, it is compared with a more advanced CodeT5 model: CodeT5 is a unified pretraining encoder-decoder transformer model, which has excellent performance in understanding and generating tasks; and finally, it is compared with the most advanced CodeT5+ model: this model is a novel large language model based on serial codes of encoder-decoder, which is intended for wide code understanding and task generation, and uses an architecture of a "shallow encoder and deep decoder", thereby significantly reducing the number of trainable parameters for effective tuning. Experimental results are shown in the following table:

| Methods | BLEU-4 | METEOR | Rouge-L | BLEURT |
|---|---|---|---|---|
| CodeT5 | 28.95% | 45.62% | 49.77% | 57.79% |
| CodeT5+ | 27.24% | 43.31% | 49.03% | 52.61% |
| CodeBERT | 26.31% | 39.57% | 44.52% | 52.74% |
| SCLA | 37.53% | 52.54% | 56.97% | 63.44% |

As shown in the above table, compared with CodeBert, CodeT5, and CodeT5+, the frame provided in the method of the present application has performance superior to the other three methods in all 4 key evaluation indexes. The score in BLEU-4 is 37.53%, the score in METEOR is 52.54%, the score in Rouge-Lis 56.97%, and the score in BLEURTL is 63.44%. The frame provided in the method of the present application obtains the BLEURT score of 63.44%, indicating that the generated abstract is more similar to the semantics of the abstract in the real world.

Therefore, the method for generating an abstract of a smart contract based on a large language model and semantic enhancement provided in the present application can effectively improve the quality of the abstract of the code of the smart contract generated by the large language model, and can be applied to development and maintenance stages of the smart contract to help developers fast understand the code, so as to realize a safer smart contract.

Figure 6:
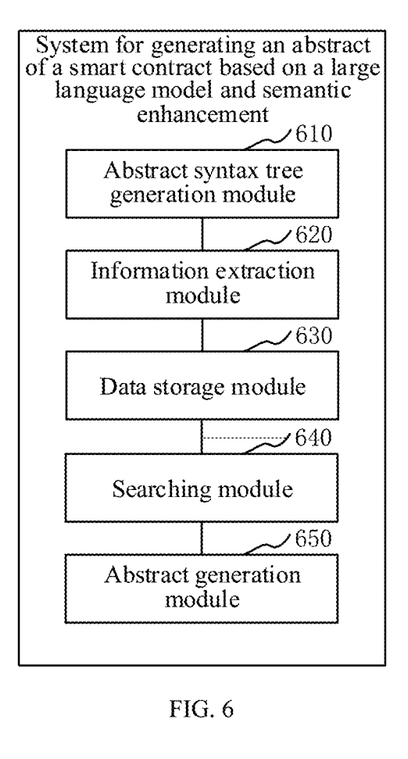
FIG. 6 is a structural block diagram of a system for generating an abstract of a smart contract based on a large language model and semantic enhancement in an embodiment.

In one embodiment, as shown in FIG. 6, provided is a system for generating an abstract of a smart contract based on a large language model and semantic enhancement, including: an abstract syntax tree generation module 610, an information extraction module 620, a data storage module 630, a searching module 640, and an abstract generation module 650, where the abstract syntax generation module 610 is configured to acquire a source code of a smart contract, and parse the source code of the smart contract to generate an abstract syntax tree;

the information extraction module 620 is configured to extract code semantic information in the source code of the smart contract from the abstract syntax tree;

the data storage module 630 is configured to traverse the abstract syntax tree, convert the source code of the smart contract into a function callback chart, and store the function callback chart and the code semantic information in a code sample database;

the searching module 640 is configured to determine a target code segment, and search for, in the code sample database, target code semantic information most similar to the target code segment and a target function callback chart; and the abstract generation module 650 is configured to input a source code of the target code segment, the target code semantic information, and the target function callback chart into the large language model, and parse data outputted by the large language model to obtain an abstract corresponding to the target code segment and outputting the abstract.

In one embodiment, the abstract syntax tree generation module 610 is further configured to parse the source code of the smart contract by using a solidity_parser tool, taking the smart contract or function in the source code of the smart contract as a root node, a sentence or expression as an internal node, and basic elements such as a variable and a constant as leaf nodes.

In one embodiment, the code semantic information includes a contract member variable, a contract type, a contract function, a function name, a function declaration, an introverted function, and function callback.

In one embodiment, the data storage module 630 is further configured to traverse each contract node in the abstract syntax tree, traverse a function node in each contract node, and traverse a function callback node in each function node; traverse each function callback node to obtain a function callback tree; traverse each function callback node in the function callback tree to obtain callback information corresponding to each function callback node; and obtain a vector-free function callback chart based on callback information.

In one embodiment, the data storage module 630 is further configured to describe the callback information corresponding to the function callback node by using graphviz; store the function callback node after the callback information is described in an unordered non-repetitive element sequence; and traverse each function callback node in the function callback tree searching for nodes in the non-repetitive element sequence till traversing the function callback tree to obtain the vector-free function callback chart.

In one embodiment, the searching module 640 is further configured to vectorize the target code segment to obtain an input matching vector; read all function codes in the code sample database, and convert each function code into a function code vector list; match the input matching vector with the function code vector list to output a target number corresponding to the function code vector most similar to the input matching vector; and read the target code semantic information and the target function callback chart from the code sample database according to the target number.

In one embodiment, the system further includes a large language training module, configured to determine sample code semantic information and a sample function callback chart and input the sample code semantic information and the sample function callback chart into the large language model; and adjust parameters in the large language model by taking the target code semantic information and the target function callback chart as learning objects.

Figure 7:
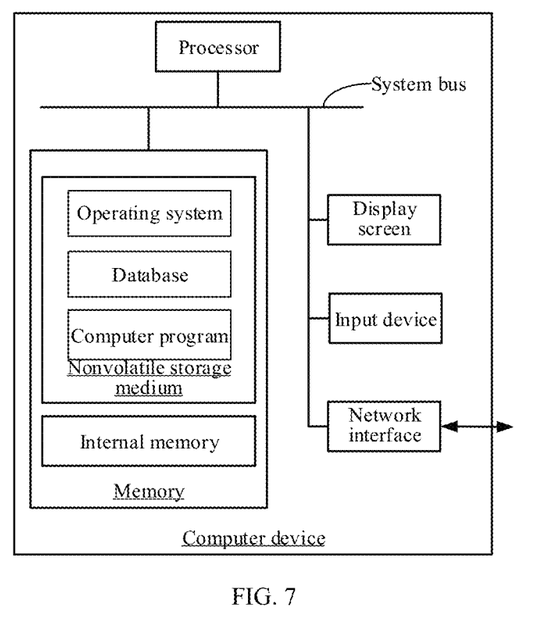
FIG. 7 is an internal structural diagram of a computer device in an embodiment.

In one embodiment, further provided is a computer device, where the computer device may be a server, the internal structure of which may be shown in FIG. 7. The computer device includes a processor, a memory, a network interface, a display screen and an input apparatus connected via a system bus. The processor of the computer is configured to provide calculation and control abilities. The memory of the computer device includes a nonvolatile storage medium and an internal memory. The nonvolatile storage medium has an operating system and a computer program thereon. The internal memory provides an environment for the operation of the operating system and the computer program in the nonvolatile storage medium. The network interface of the computer device is used for connected communication with an external terminal via a network. The computer program, when executed by the processor, implements the method for generating an abstract of a smart contract based on a large language model and semantic enhancement. The display screen of the computer device may be a liquid crystal display screen or an electronic ink display screen. The input apparatus of the computer device may be either a touch layer covered by the display screen or a button, a trackball, or a touch panel arranged on an outer shell of the computer device or a keyboard, a control panel, or a mouse that are connected externally, and the like.

Those skilled in the art can understand that the structure illustrated in FIG. 7 is merely a block diagram of a partial structure related to the solution of the application and does not constitute a limitation to the computer device in the solution of the application applied thereto. The specific computer device may include more or less components shown in figures or combine some components or have different component arrangements.

In one embodiment, provided is a computer device, including a memory and a processor, the memory storing a computer program, where the processor realizes the steps of the method for generating an abstract of a smart contract based on a large language model and semantic enhancement when executing the computer program.

In one embodiment, provided is a computer readable storage medium, having a computer program stored therein, where the computer program, when executed by a processor, implements the method for generating an abstract of a smart contract based on a large language model and semantic enhancement.

Those of ordinary skill in the art can understand that all or part of flows in the methods of the embodiment are implemented by instructing related hardware via the computer program. The computer program can be stored in a nonvolatile computer readable storage medium. When the computer program is executed, it can include flows of the embodiments of the above methods. Any citation of the memory, storage, database, or other media provided by the application and used in the embodiments can include a nonvolatile and/or volatile memory. The nonvolatile volatile memory can include a read-only memory (ROM), a programmable ROM (PROM), an electrically programmable ROM (EPROM), an electrically erasable programmable ROM (EEPROM), or a flash memory. The volatile memory can include a random access memory (RAM) or an external high-speed cache memory. As description rather than limitation, the RAM can be obtained in various forms, for example, a static RAM (SRAM), a dynamic RAM (DRAM), a synchronous DRAM (SDRAM), a double data rate SDRM (SSRSDRAM), an enhanced SDRAM (ESDRAM), a synchronization link (Synchlink) DRAM (SLDRAM), a memory bus (Rambus) direct RAM (RDRAM), a direct memory bus dynamic RAM (DRDRAM), a memory bus dynamic RAM (RDRAM), and the like.

The technical features of the above embodiments may be combined freely. In order to describe briefly, the description is not made on all possible combinations of the technical features of the embodiments. However, the combinations of these technical features should be considered as a scope of the specification as long as there is no contradiction.

The above embodiments only express several embodiments of the present application, are described in more detail, but are not to be construed as a limitation to the scope of the applied patent. It is to be noted that several variations and modifications may also be made by persons skilled in the art without departing from the spirit of the present application, which all fall within the protection scope of the present application. Therefore, the protection scope of the patent of the present application shall be subjected to the appended claims.

What is claimed is:

1. A method for generating an abstract of a smart contract based on a large language model and semantic enhancement, comprising:
   acquiring a source code of a smart contract, and parsing the source code of the smart contract to generate an abstract syntax tree;
   extracting code semantic information in the source code of the smart contract from the abstract syntax tree;

traversing the abstract syntax tree, converting the source code of the smart contract into a function callback chart, and storing the function callback chart and the code semantic information in a code sample database;

determining a target code segment, and searching for, in the code sample database, target code semantic information most similar to the target code segment and a target function callback chart; and inputting a source code of the target code segment, the target code semantic information, and the target function callback chart into the large language model, and parsing data outputted by the large language model to obtain an abstract corresponding to the target code segment and outputting the abstract.

2. The method for generating an abstract of a smart contract based on a large language model and semantic enhancement according to claim 1, wherein the parsing the source code of the smart contract to generate an abstract syntax tree comprises:

parsing the source code of the smart contract by using a solidity_parser tool, and taking the smart contract or a function in the source code of the smart contract as a root node, a sentence or expression as an internal node, and basic elements such as a variable and a constant as leaf nodes.

3. The method for generating an abstract of a smart contract based on a large language model and semantic enhancement according to claim 1, wherein the code semantic information comprises a contract member variable, a contract type, a contract function, a function name, a function declaration, an introverted function, and function callback.

4. The method for generating an abstract of a smart contract based on a large language model and semantic enhancement according to claim 1, wherein the traversing the abstract syntax tree, converting the source code of the smart contract into a function callback chart comprises:

traversing each contract node in the abstract syntax tree, traversing each function node in each contract node, and traversing a function callback node in each function node;

traversing each function callback node to obtain a function callback tree;

traversing each function callback node in the function callback tree to obtain callback information corresponding to each function callback node; and obtaining a vector-free function callback chart based on the callback information.

5. The method for generating an abstract of a smart contract based on a large language model and semantic enhancement according to claim 4, further comprising:

describing the callback information corresponding to the function callback node by using graphviz;

storing the function callback node after the callback information is described in an unordered non-repetitive element sequence; and traversing each function callback node in the function callback tree, and searching for nodes in the non-repetitive element sequence till traversing the function callback tree to obtain the vector-free function callback chart.

6. The method for generating an abstract of a smart contract based on a large language model and semantic enhancement according to claim 1, wherein the determining a target code segment, and searching for, in the code sample database, target code semantic information most similar to the target code segment and a target function callback chart comprise:

vectorizing the target code segment to obtain an input matching vector;

reading all function codes in the code sample database and converting each function code into a function code vector list;

matching the input matching vector with the function code vector list to output a target number corresponding to the function code vector most similar to the input matching vector; and reading the target code semantic information and the target function callback chart from the code sample database according to the target number.

7. The method for generating an abstract of a smart contract based on a large language model and semantic enhancement according to claim 1, wherein a training process of the large language model comprises:

determining sample code semantic information and a sample function callback chart and inputting the sample code semantic information and the sample function callback chart into the large language model; and adjusting parameters in the large language model by taking the target code semantic information and the target function callback chart as learning objects.

8. A system for generating an abstract of a smart contract based on a large language model and semantic enhancement, comprising:

an abstract syntax generation module, configured to acquire a source code of a smart contract, and parse the source code of the smart contract to generate an abstract syntax tree;

an information extraction module, configured to extract code semantic information in the source code of the smart contract from the abstract syntax tree;

a data storage module, configured to traverse the abstract syntax tree, convert the source code of the smart contract into a function callback chart, and store the function callback chart and the code semantic information in a code sample database;

a searching module, configured to determine a target code segment, and search for, in the code sample database, target code semantic information most similar to the target code segment and a target function callback chart; and an abstract generation module, configured to input a source code of the target code segment, the target code semantic information, and the target function callback chart into the large language model, and parse data outputted by the large language model to obtain an abstract corresponding to the target code segment and outputting the abstract.

* * * * *